June 16, 1953 N. A. NELSON 2,641,854
EARTH-MOVING ATTACHMENT FOR TRACTORS
Filed Jan. 4, 1947 4 Sheets-Sheet 1
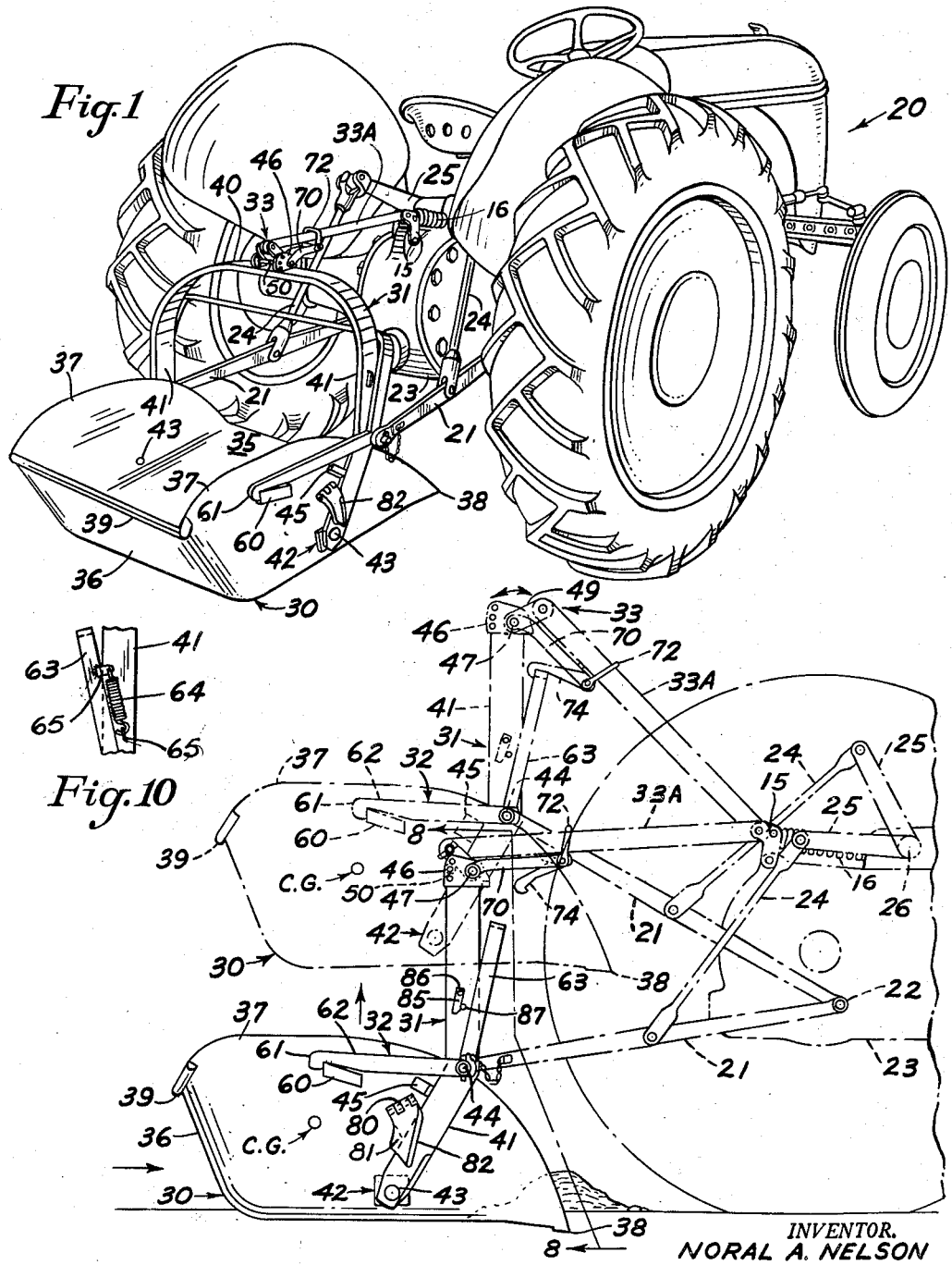
INVENTOR.
NORAL A. NELSON
BY
ATTORNEYS

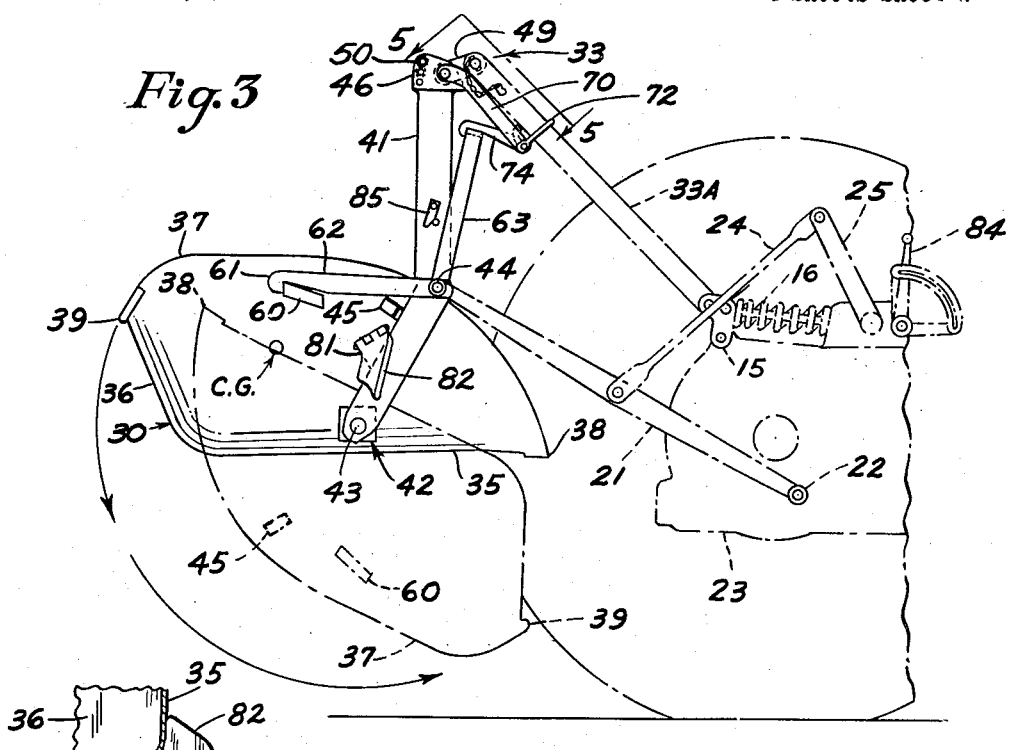
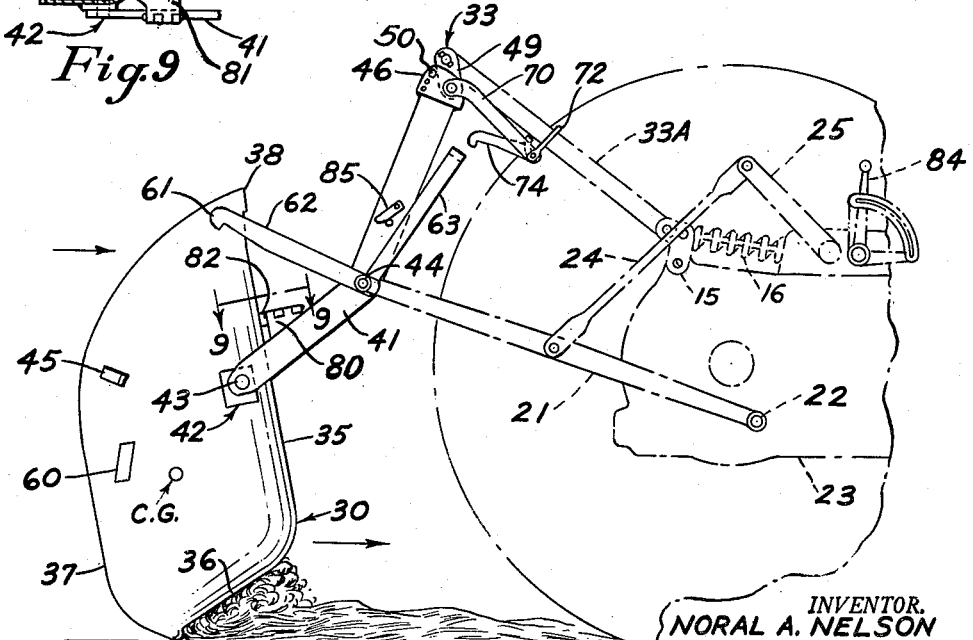

June 16, 1953 N. A. NELSON 2,641,854
EARTH-MOVING ATTACHMENT FOR TRACTORS
Filed Jan. 4, 1947 4 Sheets-Sheet 3
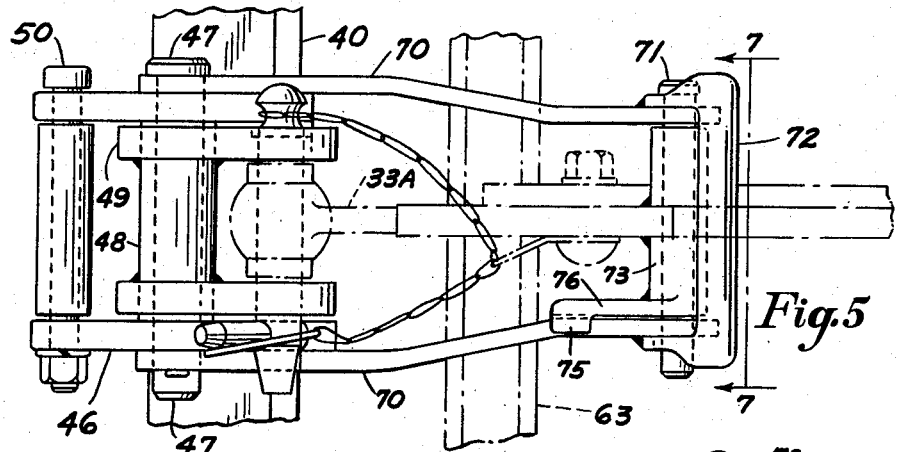
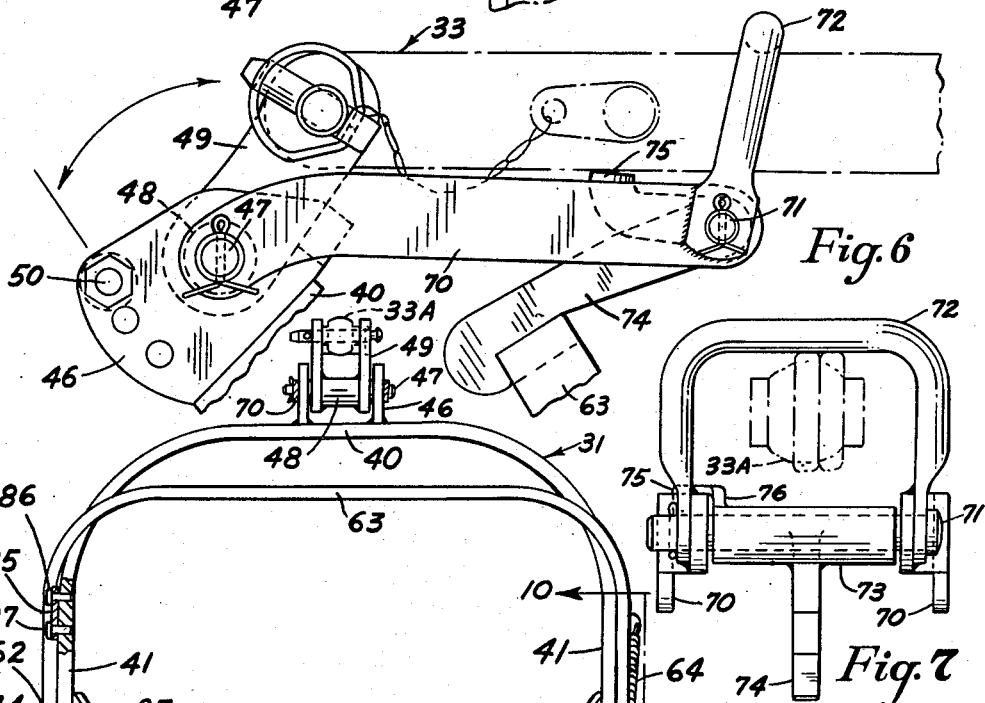
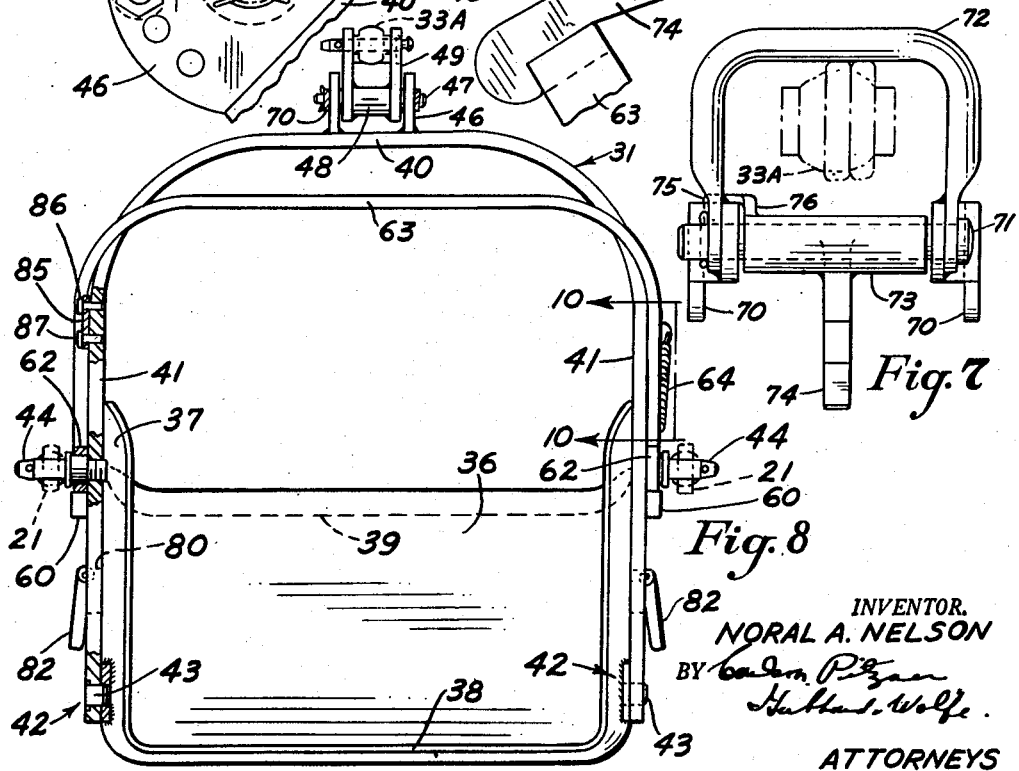
INVENTOR.
NORAL A. NELSON
BY
ATTORNEYS June 16, 1953 N. A. NELSON 2,641,854
EARTH-MOVING ATTACHMENT FOR TRACTORS
Filed Jan. 4, 1947 4 Sheets-Sheet 4

INVENTOR
NORAL A. NELSON

BY

ATTORNEYS

Patented June 16, 1953

2,641,854

UNITED STATES PATENT OFFICE 2,641,854

EARTH-MOVING ATTACHMENT FOR TRACTORS

Noral A. Nelson, Berkley, Mich., assignor to Harry Ferguson, Inc., Detroit, Mich., a corporation of Delaware Application January 4, 1947, Serial No. 720,206

15 Claims. (Cl. 37—126)

The present invention pertains to an earth moving attachment for tractors and more particularly to dig-and-carry type scrapers.

It is an object of the invention to provide a new and improved dig-and-carry type scraper attachment for mounting on a tractor and which can be operated and controlled solely by actuation of the auxiliary power operating means on the tractor.

Another object lies in the provision of an earth moving attachment for pivotal support on tractor hitch means which is so constructed and arranged that when in digging condition a cutting angle with respect to the ground is assumed and when in transporting condition the bowl thereof is tipped rearwardly whereby to permit soil to be retained therein.

A more specific object of the invention is to provide an excavator attachment comprising a scoop pivotally supported on a draft link trailingly pivoted on the rear end portion of a tractor and means operatively associated with the auxiliary power actuating mechanism on the tractor whereby the scoop will be overbalanced rearwardly and discharge of a load carried therein will be automatically accomplished upon release of bowl retaining means as an incident to the operation of the auxiliary power actuating mechanism in a manner to lower the scoop.

Another object is to provide means for retaining an earth moving attachment of the aforementioned character in position for a leveling operation which means is engageable with the bowl of the scraper at the option of the user.

Still another object lies in the provision of means for disabling the bowl retaining means whereby to permit the earth moving attachment to be used in the manner of a simple slip type scoop.

Other objects and advantages of the invention will become apparent from the following detailed description of the preferred embodiment disclosed in the accompanying drawings, in which:

Figure 1 is a rear perspective view of an earth moving attachment embodying the present invention, the same being shown applied to a suitable tractor.

Fig. 2 is a side elevation of the attachment of Fig. 1, showing the same applied to the tractor hitch, the attachment appearing in digging and in carrying positions, respectively, in full and broken lines.

Fig. 3 is a side elevation similar to Fig. 2 illustrating the attachment in transport position in full lines and showing the same in overturned dumping position in broken lines.

Fig. 4 is again a side elevation similar to Fig. 2, but in this instance showing the attachment arranged for leveling operation.

Fig. 5 is an enlarged fragmentary plan view of the connection between the upper hitch link and the supporting frame of the attachment taken substantially along line 5—5 of Fig. 3.

Fig. 6 is a fragmentary side elevation of the mechanism shown in Fig. 5.

Fig. 7 is an end elevation taken substantially along the line 7—7 of Fig. 5.

Fig. 8 is an end elevational view of the earth moving attachment taken substantially along the line 8—8 of Fig. 2.

Fig. 9 is an enlarged fragmentary plan view taken substantially in the plane of line 9—9 in Fig. 4.

Fig. 10 is a fragmentary side elevational view taken in the plane of line 10—10 of Fig. 8.

Figure 11:
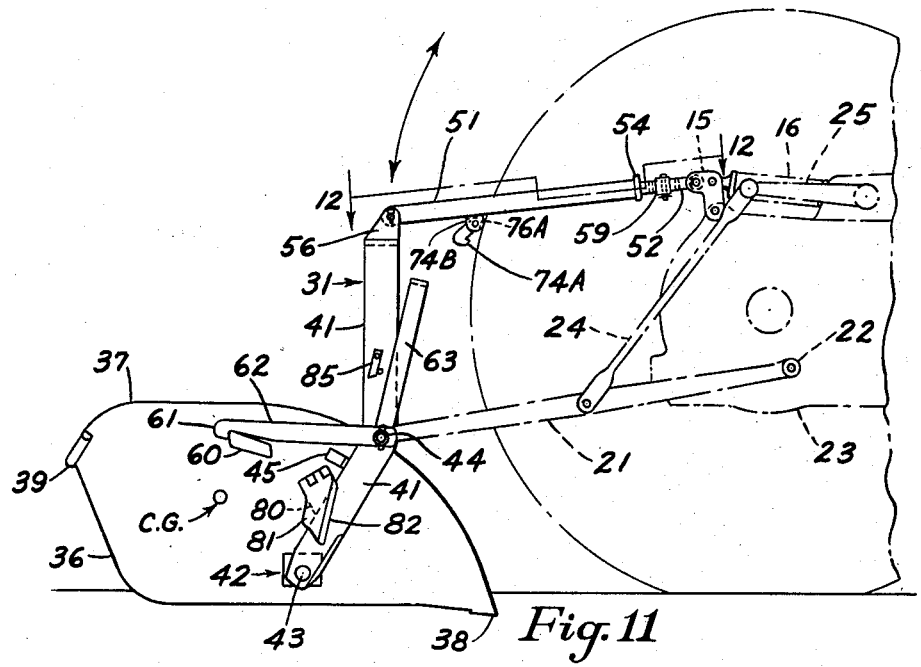
Fig. 11 is a side elevational view of a modified form of earth moving attachment also embodying the present invention.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the first exemplary embodiment of the invention illustrated in the drawings (see Fig. 1), it will be seen that the dig-and-carry earth moving attachment there shown is attached to a tractor 20 which may be, for example, a light weight agricultural tractor which those schooled in the art will readily identify as being equipped with the well known Ferguson System. For details of the latter, reference may be made to Henry George Ferguson Patent No. 2,118,180 issued May 24, 1938. For the present, suffice it to say that a pair of laterally spaced lower draft links 21 is arranged to trail from the rear end portion of the tractor, being pivoted at 22 for vertical swing on the differential housing 23 of the tractor. These draft links 21 are connected by drop links 24 with a pair of vertically swingable crank arms 25 rigidly connected to a rock shaft 26 and which is adapted to be rocked by a hydraulic power unit (not shown) on the tractor. By suitable actuation of the hydraulic unit, the draft links may be swung between the elevated transport position (shown in broken lines in Fig. 2) and a lowered working position (shown in full lines in Fig. 2).

The present invention concerns a novel dig-and-carry earth moving attachment adapted for operation on the aforementioned Ferguson hitch. In the instant embodiment of the invention such attachment comprises a scoop type scraper bowl 30, a supporting frame or bail 31 which is operatively associated with the aforementioned hitch mechanism, and latch means 32 which is operable in conjunction with the bail 31 and an upper hitch linkage 33. The novel earth moving attachment is so constructed and arranged that when it is in lowered or digging position the bowl 30 is tipped slightly forwardly, assuming a cutting angle with respect to the soil. Upon raising to carrying position, the cutting lip of the scoop will tilt upwardly slightly, thereby tending to keep the soil in the scoop bowl. The bowl 30 is pivotally attached to the bail 31 in such a manner that it is overbalanced rearwardly and upon release of the latch means 32 it will rotate rearwardly to dump its load. Further, means is provided to allow the bowl to be retained in up-ended position so that a leveling operation can be carried out.

Turning now to a more detailed consideration of the disclosed structure, it will be observed that the bowl 30 has a bottom wall 35, a rear wall 36 and side walls 37. The front edge margins of the bottom wall and the side walls are reinforced as at 38 to provide strong soil cutting edges. The top of the rear wall is also reinforced as at 39 so that this edge can withstand the wear and abuse which it may receive, as, for example, that incident to a soil leveling operation which will be later described.

The supporting member, or bail, generally indicated at 31 is of inverted U-shape, comprising a transverse central section 40 and leg sections 41 which straddle the sides of the bowl 30. The lower ends of the legs 41 are pivotally secured to the bowl by means of trunnions 42 having projecting pins 43, the trunnions 42 being welded to the bowl sides 37 and located forward of the center of gravity of the bowl, the latter being indicated approximately at "C. G." in Figs. 2 and 3. Approximately on the level of the top of the bowl, the lower portions of the bail legs 41 are turned rearwardly and at this point the pivot pins 44 for affording connection between the bail and the rear ends of the lower draft links 21 are located. The angularity of the lower portions of the legs and the location of the pivots 42 are selected to the end that when draft force is applied at the pivot points 44, the front edge of the bowl will tend to assume a cutting angle with respect to the ground and hence dig in. Under such condition of operation the bowl will tend to cant forward about the pivots 42, such movement being limited by stop blocks 45 rigidly secured to the bowl sides 37.

Provision is made for limited fore and aft rocking of the bail 31 between a rearward position in which the bowl 30 is tipped backward slightly from the horizontal to retain its contents securely, and a forward position in which the bowl 30 is tilted forward slightly in digging position. Such provision desirably includes a longitudinally extensible top linkage or, in other words, a lost motion connection from frame to top link. In the presently considered embodiment such arrangement includes a pair of vertically projecting ears 46 in the bail and carrying a pin 47 rockably supporting a bushing 48. Rigidly secured to the bushing 48 is a pair of link arms 49 (see Fig. 5). Pivotally joined to the other ends of the link arms 49 is the trailing end of upper hitch link 33A which is pivoted at its forward end to the usual shackle 15 pivoted on the upper side of the differential housing at the rear of the tractor. When the scoop is lowered and the tractor is moving to fill the scoop, the upper hitch linkage 33 is under compression as the top of the bail tends to swing forwardly about the pivotal connection at 44. The link arms 49 are jackknifed into such position with respect to the link 33A that they extend upwardly and rearwardly from the bail ears 46 to the trailing end of the link 33A. The rearward swing of the link arm 49 is limited by a through-bolt 50 that extends between the ears 46. The position of the bolt 50 is adjustable whereby to permit adjustment of the cutting angle assumed by the bowl.

When the desired loading of the scraper has been attained the hydraulic power unit (not shown) on the tractor is actuated to elevate the scraper to carrying position. As the scraper is lifted, the rearward overbalance of the bowl causes a rearward tipping thereof and of the bail 31. This causes the compressive condition on the upper linkage 33 to change to a tension condition and the trailing ends of the link arms 49 which are secured to the bail ears 46 to swing rearwardly. This action results in a relatively upward tilting of the cutting lip of the scoop thereby tending to retain the soil in the bowl.

Means is provided for latching the bowl in a horizontal position so that it may be raised from digging position to transporting position for transporting the load. This latch means is disengageable automatically upon simply an initiation of lowering movement or what may conveniently be termed "jogging" of the hitch linkage from its uppermost position in order that a load carried in the bowl may be dumped at will. Complete and readily accomplished control of the scoop is thus afforded.

In the present instance there is located on each of the side walls 37 of the bowl 30, a latch block or abutment 60 near the upper edges of said walls and rearwardly of the bail 31. Each block is engageable by a cooperating abutment in the form of a hooked end 61 of a latch arm 62 which extends forwardly and is pivoted on the link pin 44. A yoke or U-shaped latch carrier 63 has its ends integral with the forward ends of the latch arms 62 adjacent the pivot holes therein. The U-shaped member 63 is therefore a part of the latch mechanism and serves as the lever through which both of the latches 60, 61 are caused to release simultaneously. To prevent inadvertent disengagement of the latches, a tension spring 64 extends between lugs 65 on one leg 41 of the bail 31 and on the U-shaped member 63. Details of this spring arrangement are shown in Fig. 10.

To release the latches 60, 61 it is necessary to exert a forward pull on the yoke or carrier 63 and thus positively withdraw the elements 61 to free the bowl. The relative scissoring motion of the bail 31 and hitch linkage incident to vertical swing of the hitch linkage is utilized for that purpose. Of the detail of the particular mechanism shown it will be observed that on the pivot pin 47, outside of the ears 46, are mounted straps 70 which extend forwardly on opposite sides of the hitch link 33A (Figs. 5 and 6). At the front ends of the straps 70 is carried a transverse pin 71 which pivotally supports the ends of a yoke member 72. The pin 71 and the yoke 72 form a loop through which the link 33A slidably extends. Between the straps 70, the pin 71 supports a tubular rockmember 73 which has centrally located thereon a hook 74 extending rearwardly and downwardly to a position for engagement with the transverse horizontal portion of the U-shaped member 63. The downward movement of the hook 74 is limited by a stop finger 75 on the end of an arm 76 rigidly secured to the tubular member 73.

Referring now to Fig. 2, after the scoop has been filled and the system actuated to raise the links 21, the upward movement initially extends the effective length of the upper linkage 33 by the forward swing of the upper ends of the link arms 49 as the bail swings rearwardly. As the upward movement continues the angle between the bail 31 and the link 33A is decreased. Thus the hook 74 has movement in the same direction as the bail 31 to a position for engagement with the transverse section of the U-shaped controlling member 63. Consequently when the mechanism reaches its upper transport position as shown in the dotted outline in Fig. 2, the hooked ends 61 of the latch arms 62 are in engagement with the latch blocks 60 and the hook 74 is engaged with the transverse section of the U-shaped member 63. Accordingly, therefore, during transport the scoop is held in a slightly rearwardly tilted position and the hook 74 is engaged preparatory to subsequent release of the latches 60, 61.

When the operator wishes to discharge a load, he simply moves the quadrant control lever 84 (Fig. 3) momentarily in a manner to drop the hitch links. The lowering movement or jogging of the hitch linkage opens the angle between the upper link 33A and the bail 31. That is to say, these members separate or scissors apart. The hook 74 thus pulls the carrier 63 forward, disengaging the latch hooks 61 from the latch blocks 60 so that the scoop or bowl 30 is freed to swing rearwardly in the direction of the arrows in Fig. 3 into the dotted position shown, thus discharging the load.

The scoop or bowl may be restored to its operative position simply by lowering the hitch links while the tractor is moving forwardly. The subsequent drag of the ground on the bowl will right the latter, rotate it in a clockwise direction as viewed in Fig. 3 until stop blocks 45 engage the bail legs 41 whereupon the hooked ends 61 of the latch arms 62 will engage the latch block 60, thus reestablishing the latched condition.

Should it be desired to use the scraper for leveling purposes, there is provided stop means optionally engageable by the user for retaining the bowl 30 in an up-ended position after it has been dumped (Fig. 4). To this end, there is fixed to the lower portion of each bail leg 41, a lug 80 which extends rearwardly and upwardly in the plane of the leg. Hinged to this lug is stop member 81 arranged to be swung from an out of the way position in which it lies substantially flat against the outer side of the lug 80, through approximately 270° to an inwardly extending position substantially perpendicular to the lug (Fig. 9). The stop member 81 has an edge face 82 complementary to the bottom surface of the bowl engaged thereby. As shown in Fig. 4, this stop member retains the bowl in substantially vertical position so that its upper rearward edge, reinforced at 39 can be used for leveling purposes when the tractor moves forwardly. The bowl will swing free when the tractor moves rearwardly.

To accommodate a scraping operation where it is desired simply to dig and spread the soil, and without any intervening transporting operation, means is provided for disabling the latches 60, 61. To this end a small finger 85 is pivoted at 86 to the outer side of one of the bail legs 41 (Figs. 2, 3, 4 and 8). This finger is rotatable on the pivot 86 to engage either side of a stop 87. In its inoperative position as shown in full outline, it engages the rear of the stop. In its opposite position it is engageable with the carrier 63 to hold the latter forwardly, stressing the spring 64, and thereby prevents engagement of the latches 60, 61. This arrangement permits the operator to utilize the scraper as a simple slip scoop and which permits the load to be dumped simply by raising the hitch links.

Figure 12:
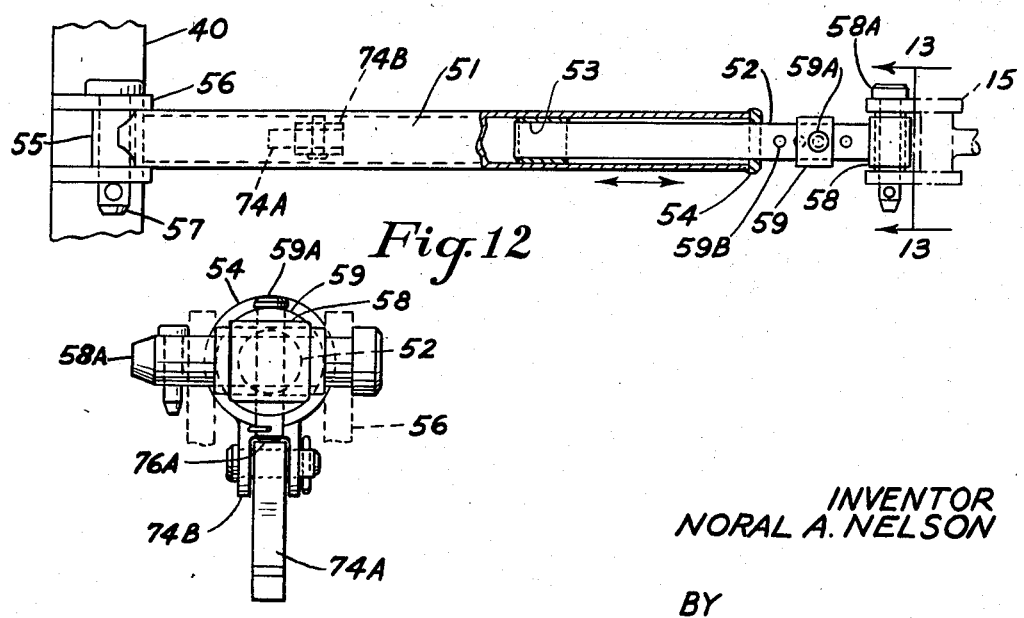
Fig. 12 is an enlarged plan view, partly in section substantially along line 12—12 of Fig. 11, of the top linkage included in the apparatus of Fig. 11.
Figure 13:
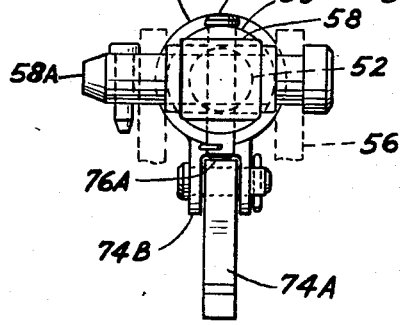
Fig. 13 is an end elevation taken in the plane of line 13—13 of Fig. 12.

Referring now to Figs. 11, 12 and 13 of the drawings, there is shown a modified construction embodying the invention and which differs from the first embodiment primarily in that another means is provided whereby the effective length of the upper hitch linkage can be changed. The action caused thereby is, in a general sense, the same as previously set forth. Replacing the jackknifing linkage 33, 49 is a telescopic arrangement comprising a rear tube 51 and a front stem 52 having its rear end portion slidably received in the front end of the tube. This inner end of the stem carries a guide head 53 in the form of a collar rigidly secured to the stem. At the forward end of the tube 51 is a wall member 54 providing another guide means. On the rear end of the tube 51 and rigidly secured thereto is a transversely extending sleeve 55 which is receivable between a pair of upstanding ears 56 carried on the central portion 40 of the bail. A removable pin 57 is inserted transversely through the ears 56 and axially of the sleeve 55 thereby pivotally connecting these parts together. To the front end of the stem 52 a second sleeve 58 is welded or otherwise rigidly secured so that this end may be pivotally connected to the rocking shackle 15 on the tractor. Between the sleeve 58 and the wall member 54 is a limiting collar 59 which surrounds the stem and is adjustable longitudinally thereof by means of a removable pin 59A passing through diametrically opposed holes in the limiting collar 59 and in one of a series of holes 59B in the stem 52.

In this arrangement the fore and aft movement of the upper end of the bail is permitted by the relative sliding movements of the tube 51 and the stem 52. The rearward movement is limited by the abutment between the members 53 and 54. Since it is sometimes necessary to adjust the angle of penetration or cut, the limit of the forward movement is determined by adjusting the position of the collar 59 along the stem 52. This adjustment can in this case be readily made by the tractor driver without even leaving his seat.

In this modification it is necessary only to provide a depending hook 74A, pivoted between ears 74B carried on the underside of the tube 51, for operating the carrier 63. A tail 76A limits the lowermost position of the hook 74A, to which position the hook swings by gravity. The remainder of the scraper attachment shown in Figs. 11 to 13 is the same as the first form of Figs. 1 to 10 and operates in the same manner. The same reference numerals have been used for identical parts and accordingly a repetition of description is unnecessary.

So far herein the hydraulic controls on the tractor have been considered simply in reference to bodily raising and lowering of the implement between digging and transport positions. It should be appreciated, however, that the arrangement is such that certain of the automatic control capabilities of the system of the tractor may be employed in retaining a safe draft load. Thus in each of the scraper attachments shown the top linkage is retained under compression by reaction of the ground on the scraper. This tends to rock the shackle 15 forward to compress the control spring 16. As is well understood in connection with the Ferguson System, if an excessive draft load is applied as compression to the top link the lift on the links 21 will be relieved permitting the tractor's rear wheels to spin safely and harmlessly so that rearing of the tractor is prevented.

It will be evident from the foregoing that a new and improved earth moving attachment has been provided for connecting to hitch means on a tractor and which is operable solely by actuation of the power operating means on the tractor. Dumping of a load carried in the attachment is effected simply by causing an initial lowering movement of the hitch linkage. The use of separate connections running from the auxiliary power source to the implement is avoided. As a result the implement can be quickly and conveniently removed simply by disengaging the connections between the lower links 21 and the scraper support member 31 and the connection between the upper link 33A and the support member 31. Such disassembly leaves the upper and lower links and the mechanisms associated therewith attached to the tractor and available for use with other implements.

I claim as my invention:

1. In a dig-and-carry earth moving attachment for mounting on a tractor having a power operated draft link and a vertically spaced compression link trailingly pivoted on its rear end portion for vertical swinging motion, the combination of a generally scoop shaped scraper bowl having a forward cutting edge along the fore part of its bottom, means for detachably connecting said bowl to the draft link for bodily raising and lowering by the latter as well as for fore and aft tilting of said bowl about a transverse axis, said axis being located forwardly of and below the center of gravity of said bowl but above and rearwardly of said cutting edge, latch means including a linkage pivotally mounted adjacent the connection between said detachable connecting means and the draft link, said latch means being adapted to releasably restrain said bowl against tilting rearwardly about said axis beyond a slightly rearwardly inclined carrying position into overturned dumping position while still leaving said bowl free to cant forwardly through a limited distance into digging position under the influence of ground suck, and a releasing hook for said latch means, said hook being adapted for attachment to the compression link in proximity with said linkage.

2. In a dig-and-carry earth moving attachment for mounting on a tractor having a laterally spaced pair of draft links and a vertically spaced compression link trailingly pivoted on its rear end portion to be swung vertically in unison by an auxiliary power unit on the tractor, the combination of a bail of inverted U-shape, means for pivotally attaching the depending legs of said bail to the draft links at points intermediate the length of said legs for fore and aft rocking of said bail with reference to the links, a generally scoop shaped scraper bowl arranged to be straddled by said bail and presenting a forward cutting edge, means pivotally connecting said bowl to the lower ends of said bail legs for fore and aft tilting of said bowl with reference to said bail about a transverse axis, said axis being located forwardly of and below the center of gravity of said bowl but rearwardly of and above said cutting edge, whereby said bowl tends when elevated by the draft links to overturn rearward for dumping and tends when lowered to cant forward into digging position by reason of the ground suck applied adjacent said cutting edge, stop means on said bowl coacting with said bail to limit the forward canting of said bowl, latch elements for releasably holding said bowl against tilting rearwardly into overturned dumping position, a latch carrier pivoted on said bail and adapted to actuate said latch elements, and a releasing hook adapted for mounting on said compression link in a position of proximity to said latch carrier and for coaction therewith.

3. In a dig-and-carry earth moving attachment for mounting on a tractor having a power operated draft link and a vertically spaced compression link trailingly pivoted on its rear end portion for vertical swinging motion, the combination of a scraper bowl having a generally flat bottom with a forward cutting edge and bordered on its sides and rear by upstanding side and rear walls, means for detachably connecting said bowl to the draft link for bodily raising and lowering by the latter as well as for fore and aft tilting of said bowl about a transverse axis, said axis being located forwardly of and below the center of gravity of said bowl so that the latter tends to rock rearward about said axis toward an overturned position for dumping of the bowl's contents, latch means for releasably retaining said bowl in a generally horizontal position, said latch means including a linkage extending into proximity with the compression link, and means adapted for attachment to the compression link in proximity with said linkage for releasing said latch means by coaction with said linkage.

4. In a dig-and-carry earth moving attachment for mounting on a tractor having a power operated draft link and a vertically spaced compression link trailingly pivoted on its rear end portion for vertical swinging motion, the combination of a generally scoop shaped scraper bowl having a forward cutting edge, means for detachably connecting said bowl to the draft link for bodily raising and lowering by the latter as well as for fore and aft tilting of said bowl about a transverse pivotal axis, the latter axis being located eccentrically of the center of gravity of said bowl whereby said bowl tends to tilt about said axis for spillage of the bowl contents, means including a linkage pivotally mounted on said detachable connecting means for releasably latching said bowl against tilting about said axis from a substantially horizontal carrying position, and a releasing member for said latching means, said releasing member being adapted for attachment to the compression link in substantially overlying relation with said linkage.

5. In a dig-and-carry earth moving attachment for mounting on a tractor having a draft linkage trailingly pivoted on its rear end portion to be swung vertically by a power unit on the tractor, the combination with a scraper bowl attachable to said linkage for bodily raising and lowering thereby and equipped with latch means for releasably retaining the bowl in an unstable generally horizontal working position, of releasing means mountable on said draft linkage in proximity with said latch means and for relative movement with respect thereto, said releasing means being operable in response to downward jogging of the hitch linkage by its power unit while the linkage is elevated for automatically releasing said latch means.

6. In a dig-and-carry earth moving attachment for mounting on a tractor having a draft linkage trailingly pivoted on its rear end portion to be swung vertically by a power unit on the tractor, the combination of a scraper bowl, means for attaching said bowl to the linkage with said bowl pivoted in unstable position in which it tends to overturn into dumping position whenever raised from the ground, coacting latch elements between said bowl and said pivotal attaching means for releasably holding said bowl in generally horizontal position, a releasing member mountable on said draft linkage for movement relative to one of said latch elements as an incident to relative movement between said draft linkage and said bowl attaching means, said releasing member being constructed and arranged for automatically releasing said latch elements to free said bowl for dumping upon downward jogging of the draft linkage by its power unit, and said latch elements being positioned for automatic reengagement upon grounding of said bowl by lowering of the draft linkage.

7. In a dig-and-carry earth moving attachment for mounting on a tractor having a draft linkage trailingly pivoted on its rear end portion for vertical movement by a power unit on the tractor, the combination of a scraper bowl, means for detachably supporting said bowl on the draft linkage for bodily vertical movement thereby as well as for fore and aft tilting of said bowl between working and dumping positions therefor, said bowl being overbalanced toward its dumping position, latch means for releasably holding said bowl in working position, and releasing means mountable on said draft linkage for automatically intercepting said latch means in response to elevation of said draft linkage, said releasing means being constructed and arranged for disengaging said latch means after interception and in response to a predetermined downward vertical movement of the draft linkage.

8. In a dig-and-carry earth moving attachment for a mounting on a tractor having a draft linkage trailingly pivoted on its rear end portion for vertical movement by a power unit on the tractor, the combination of a scraper bowl having a forward cutting edge, means for detachably supporting said bowl on the draft linkage for bodily movement thereby and with the bowl pivoted unstably to overturn rearwardly with reference to the draft linkage into dumping position, coacting latch elements for releasably holding said bowl against rearward tipping, and a releasing member mountable on said draft linkage for automatically intercepting one of said coacting latch elements in response to movement of said draft linkage to a fully elevated transport position, said releasing member being constructed and arranged for disengaging said coacting latch elements in response to initiation of lowering movement of the draft linkage from said fully elevated transport position.

9. In a dig-and-carry earth moving attachment for mounting on a tractor having a vertically movable power operated draft link and a compression link trailingly pivoted on its rear end portion, the combination of a scraper bowl presenting a forward cutting edge, means for detachably pivoting said bowl on the draft link for bodily raising and lowering of the bowl as well as for tilting of said bowl about a transverse pivotal axis located with said bowl overbalanced rearwardly toward dumping position, a first abutment rigid with said bowl, a coacting second abutment, a pivoted carrier for said second abutment swingable to shift such second abutment into and out of a position in which it intercepts said first abutment to restrain said bowl against tipping to dumping position, a hook member detachably mountable on the compression link in position for interception of said pivoted carrier in response to elevation of said bowl by said draft link, said hook member being operable in response to initiation of lowering of said bowl from its elevated position by the draft link for swinging said carrier to clear said second abutment from the first and thereby free said bowl to overturn into dumping position.

10. In a dig-and-carry earth moving attachment for mounting on a tractor having a vertically swingable and laterally spaced pair of power operated draft links trailingly pivoted on its rear end portion, the combination of a scraper bowl presenting a forward cutting edge, a frame on which said bowl is pivoted to tilt about a transverse pivotal axis located with said bowl overbalanced rearwardly toward dumping position, means for pivotally attaching said frame to the draft links for bodily raising and lowering by the same, a top link pivoted to said frame and adapted for pivotal attachment to the tractor for retaining said frame in generally upright position, a first abutment rigid with said bowl, a coacting second abutment, a carrier for said second abutment swingably mounted on said frame to shift such second abutment into and out of a position in which it intercepts said first abutment to restrain said bowl against tipping to dumping position, and means carried by said upper link for positively moving said carrier to clear said second abutment from the first upon initiation of lowering of said frame and bowl by the draft links.

11. In a dig-and-carry earth moving attachment for mounting on a tractor having upper and lower links trailingly pivoted on its rear end portion to swing vertically and equipped with an auxiliary power unit for raising at least one of said links, the combination of a frame, means for detachably pivoting said frame to the links in generally upright position to effect scissoring of said frame toward and away from each of said links as an incident to raising and lowering of said frame by the links, a scraper bowl pivoted to said frame to rock fore and aft thereon and presenting a forward cutting edge, said scraper bowl being overbalanced about its pivotal connection to the frame so that it normally tends, when elevated, to overturn into dumping position, coacting latch means carried respectively by said frame and bowl for releasably restraining said bowl against overturning, and a releasing member attachable to one of the tractor links in a position permitting relative movement between said member and said latch means in response to the scissoring of said frame relative to said one link, said releasing member being disposed for interception of said latch means as an incident to raising of said frame by the links to an elevated position, said releasing member being constructed and arranged to effect positive disengagement of said latch means as an incident to initiation of lowering of said frame by the links from said elevated position.

12. In a dig-and-carry earth moving attachment for mounting on a tractor having upper and lower links trailingly pivoted on its rear end portion to swing vertically and equipped with an auxiliary power unit for raising at least one of said links, the combination of a frame, means for detachably pivoting said frame to the links in generally upright position to effect scissoring of said frame toward and away from each of said links as an incident to raising and lowering of said frame by the links, a scraper bowl pivoted to said frame to rock fore and aft thereon and presenting a forward cutting edge, said scraper bowl being overbalanced about its pivotal connection to the frame so that it normally tends, when elevated, to overturn into dumping position, latch means for releasably restraining said bowl against overturning, said latch means including a first latch element on said bowl and a latch carrier with a coacting second latch element on it, said latch carrier being pivoted on said frame to swing between a position in which said elements are engaged and a seccond position in which they are freed of each other, a hook carried by the upper link in position to engage said carrier when the links are elevated, and said hook being located to pull said carrier to said second position as an incident to the scissoring of said frame and upper link away from each other upon initiation of lowering of the links.

13. In an earth moving attachment for mounting on a tractor having a power-operated vertically-swingable draft linkage including an upper link and a pair of draft links trailingly pivoted on its rear end portion, the combination of a supporting frame, a scoop shaped scraper bowl presenting a forward cutting edge and pivoted on said frame to rock fore and aft thereof about a transverse axis between a forward position and a rearwardly overturned position, coacting abutments on bowl and frame limiting the forward tilt of said bowl with reference to said frame, and means for effecting a detachable pivotal connection of said frame to said draft links, a relatively short link arm interposed between and pivotally connectible with said frame and the upper link, said link arm defining a lost motion connection whereby said frame is free to rock forward a distance limited by such lost motion connection under the influence of soil suck on said bowl, and adjusting means for varying the extent of movement of said link arm so as to effect a corresponding variation in the cutting angle of said bowl.

14. In an earth moving attachment for mounting on a tractor having a lower power operated draft link trailingly pivoted on its rear portion to swing vertically, the combination of a frame adapted for pivotal attachment to the draft link, a longitudinally extensible upper link including a pair of telescoping elements, abutment means for adjustably limiting the relative longitudinal movement of said elements under applied compression and tension loads, means for pivotally connecting said upper link at opposite ends to said frame and to the rear portion of the tractor, a soil scoop pivoted to said frame to rock fore and aft thereof and overbalanced to turn rearwardly into dumping position, latch means including members operatively associated with one of said telescoping elements for releasably holding said scoop against overturning rearwardly beyond a carrying position in which said upper link is extended by tension load to cant said scoop slightly to the rear, and means for limiting forward tilt of said scoop with reference to said frame under the influence of said suck applied to said scoop, the compressed length of said upper link limiting the digging angle of said scoop.

15. In a dig-and-carry earth moving attachment for mounting on a tractor having a vertically movable power operated draft linkage trailingly pivoted on its rear end portion, the combination of a scraper bowl presenting a forward cutting edge, a supporting frame adapted for pivotal attachment to said draft linkage, means pivoting said bowl on said frame to rock freely fore and aft thereof, latch means including latching abutments, a carrier for one of the abutments and a hook element engageable with the carrier, said means being operatively associated with said draft linkage for retaining said bowl in position for digging or carrying and said latching abutments being releasable automatically by coaction of said hook and carrier upon initiation of lowering of the draft linkage from fully elevated position, and means for preventing coaction of said hook and carrier to disable said latch means to thereby free said scraper bowl for use as a simple slip type scoop.

NORAL A. NELSON.

References Cited in the file of this patent

UNITED STATES PATENTS

| Number | Name | Date |
|---|---|---|
| 2,273,359 | Johnson | Feb. 17, 1942 |
| 2,273,875 | Livesey et al. | Feb. 24, 1942 |
| 2,295,850 | King | Sept. 15, 1942 |
| 2,352,466 | Arps | June 27, 1944 |
| 2,364,121 | Arps | Dec. 5, 1944 |
| 2,548,461 | Arps | Apr. 10, 1951 |